(12) United States Patent
Jang et al.

(10) Patent No.: US 9,296,617 B2
(45) Date of Patent: ***Mar. 29, 2016

(54) METHOD FOR SEPARATING AND RECOVERING SILICON FROM SILICON SLUDGE

(71) Applicant: Korea Institute of Geoscience and Mineral Resources, Daejeon (KR)

(72) Inventors: Hee Dong Jang, Daejeon (KR); Han Kwon Chang, Daejeon (KR); Dae Sup Kil, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 767 days.

This patent is subject to a terminal disclaimer.

(21) Appl. No.: 13/653,794

(22) Filed: Oct. 17, 2012

(65) Prior Publication Data
US 2013/0277201 A1    Oct. 24, 2013

(30) Foreign Application Priority Data
Apr. 11, 2012   (KR) .................. 10-2012-0037647

(51) Int. Cl.
C01B 33/02    (2006.01)
C01B 33/037   (2006.01)

(52) U.S. Cl.
CPC .............. *C01B 33/037* (2013.01); *C01B 33/02* (2013.01)

(58) Field of Classification Search
CPC .................................................. C01B 33/037
See application file for complete search history.

(56) References Cited

U.S. PATENT DOCUMENTS

| 2,982,620 | A | * | 5/1961 | Beattie et al. | 423/343 |
| 2007/0231236 | A1 | * | 10/2007 | Kajimoto et al. | 423/342 |
| 2010/0032630 | A1 | * | 2/2010 | Hariharan et al. | 252/516 |
| 2010/0129281 | A1 | * | 5/2010 | Bakke et al. | 423/341 |

FOREIGN PATENT DOCUMENTS

KR    1020110082894 A    7/2011

OTHER PUBLICATIONS

Lin et al., "Recovery of silicon powder from kerf loss slurry by centrifugation", Powder Technology 200 (2010) 216-223.*
Xiao et al., "Potential Routes for Recycling and Reuse of Silicon Kerf", Advanced Materials Research vols. 295-297 (2011) pp. 2235-2240.*
DOW Ethylene Glycols.*

(Continued)

*Primary Examiner* — Renee E Robinson
*Assistant Examiner* — Jonathan Miller
(74) *Attorney, Agent, or Firm* — The Webb Law Firm (57) ABSTRACT

Disclosed is a method for selectively separating and recovering silicon from waste silicon sludge generated during a semiconductor manufacturing process. With the method for separating and recovering silicon from the silicon sludge, oil components, iron, silicon carbide that are included in the silicon sludge may be removed and silicon may be selectively separated and recovered. In addition, silicon may be efficiently recovered without injection of an additive for precipitating a specific component or without a separate device such as a magnetic separator, or the like, for removing iron.

4 Claims, 4 Drawing Sheets

(56) References Cited

OTHER PUBLICATIONS

Kil et al., Separation and Recovery of Silicon Powder from Waste Silicon Sludge, KIGAM Bulletin, 2008, pp. 57-62, vol. 12, No. 1.

Kil, D. et al, Separation and Recovery of Silicon Powder from Waste Silicon Sludge, KIGAM Bulletin, Nov. 21, 2007, pp. 57-62, vol. 12, No. 1. (English-language Abstract included).

* cited by examiner

METHOD FOR SEPARATING AND RECOVERING SILICON FROM SILICON SLUDGE

CROSS-REFERENCE TO RELATED APPLICATIONS

This application claims priority under 35 U.S.C. §119 to Korean Patent Application No. 10-2012-0037647, filed on Apr. 11, 2012, in the Korean Intellectual Property Office, the disclosure of which is incorporated herein by reference in its entirety.

TECHNICAL FIELD

The following disclosure relates to a method for separating and recovering silicon from silicon sludge.

BACKGROUND

In a process of cutting a silicon ingot in order to manufacture a silicon wafer for a semiconductor and a solar cell, a wire saw has been generally used. Here, the wire has a diameter of about 0.14 μm, and sludge for cutting that contains silicon carbide (SiC) having an average particle size of 20 μm has been used. In most of the domestic silicon wafer manufacturing process, sludge containing a large amounts of SiC, silicon particles, cutting oil, and the like, has been generated, and all of this sludge was buried underground by waste disposal company until a few years ago. However, processed sludge in which an abrasive material and the cutting oil are mixed with each other contributes to about 68.1% in view of cost of a silicon wafer processing process. Therefore, a technology of separating/recovering SiC having an average particle size of 20 μm and the cutting oil that are included in the silicon sludge to reuse in a silicon wafer cutting process has been developed and has been used. However, even in the case in which reusable components is separated/recovered from the sludge generated as describe above to thereby be reused, it was known that an amount of waste sludge remaining as a final residue to be discharged has grown to about 21,000 tons per year, based on 2010, and in accordance with rapid growth of a photovoltaic silicon wafer industry, generation of the waste sludge will also correspondingly increase.

Since the sludge generated at the time of manufacturing a silicon wafer is classified as a specified waste, the sludge may not be treated by simply burning nor be simply buried due to the cutting oil component contained in the sludge. However, in the case in which useful components contained in the sludge may be effectively separated/recovered, SiC may be used as a raw material of a ceramic such as a high temperature refractory, a silica composite, or the like, and silicon powders may be used as a synthetic material of high purity silicon compounds and be used to manufacture a poly-silicon at the time of ultra-high purification. In the silicon sludge, although slightly different according to companies, generally silicon, SiC, and an oil component used as the cutting oil are mixed. Therefore, in order to effectively separate these materials and make products, a liquid and a solid should be efficiently separated. In the silicon sludge, small amounts of additives and metal components may be included as well as the cutting oil and the abrasive material, and particularly, in the case of oil components, which are liquid components, by-products having a low thermal stability may be easily generated in a purification process. Therefore, in order to purify the oil component from the silicon sludge and utilize the solid component as the ceramic material, a heat treatment technology of efficiently removing the oil component such as ethylene glycol and a technology of controlling and separating trace components such as the additive and metal should be developed. In the silicon sludge from which the oil component and metal component are removed, silicon and silicon carbide particles remain, and in the case in which these two kinds of particles are efficiently separated, the silicon particles and the silicon carbide particles are obtained. These particles may be used as raw materials of various materials such as silicon compounds, structural ceramics, and the like.

RELATED ART DOCUMENT

Non-Patent Document (Non-Patent Document 1) KIGAM Bulletin, Vol 12, No 1, pp. 57-62 (Nov. 21, 2007)

SUMMARY

An embodiment of the present invention is directed to providing a method for separating and recovering reusable silicon from silicon, silicon carbide, and cutting oil and a small amount of iron that are included in waste silicon sludge generated in a semiconductor manufacturing process to thereby be reused.

In one general aspect, there is provided a method for separating and recovering silicon from silicon sludge including: (a) distilling silicon sludge generated in a semiconductor manufacturing process to remove oil components; (b) dispersing the distilled silicon sludge to prepare a silicon sludge solution; (c) performing ultrasonic treatment on the silicon sludge solution; (d) performing centrifugation on the ultrasonic treated silicon sludge solution to perform phase-separation; and (e) recovering silicon particles from the phase-separated silicon sludge solution.

Hereinafter, the present invention will be described in detail.

In step (a), the distillation of the silicon sludge may be performed at 100 to 300° C., and more particularly, it may be most preferable in view of removal of the oil component in addition to cutting oil in the silicon sludge that the distillation of the silicon sludge is performed at 150 to 200° C. When the distillation temperature is excessively low, a process time may be significantly increased, and when the distillation temperature is excessively high, oil may be partially decomposed causing discoloration.

In the distilled silicon sludge, the remaining oil components may be washed and removed using a solvent, followed by being dried, such that powders may be obtained. As the used solvent in this case, any organic solvent capable of washing the oil component may be used, and more specifically, methanol, ethanol, hexane, dichloromethane, or the like, may be used, but is not limited thereto.

As a method for drying the silicon sludge, any drying method may be used as long as the method is generally used, and in order to reduce a process time, the silicon sludge may be dried in a dry oven at 80 to 100° C. for 2 to 3 hours.

In the distilled, washed, and dried silicon sludge powder, the oil component is removed, and silicon, silicon carbide, and a small amount of metal components are included, which is dispersed in distilled water, such that a colloidal silicon sludge solution may be prepared. Here, it may be preferable in view of efficiency in a next ultrasonic treatment step that a concentration of silicon sludge of the silicon sludge solution is 2 to 4 weight %.

In the colloidal silicon sludge solution, adhered silicon-silicon carbide may be separated from each other by ultrasonic treatment.

The ultrasonic treatment of the silicon sludge solution may be performed by directly or indirectly applying ultrasonic waves to the solution, and those skilled in the art may select and perform an ultrasonic treatment method among general ultrasonic treatment methods as needed.

The ultrasonic treatment of the silicon sludge solution may be performed at an intensity of 100 W to 500 W for 10 to 300 minutes, and in this case, the adhered silicon-silicon carbide may be most efficiently separated. In the case in which the intensity of the ultrasonic wave is excessively strong, a temperature of the silicon sludge is rapidly increased to evaporate the solution, such that it may be difficult to continue the ultrasonic treatment, and in the case in which the intensity of the ultrasonic wave is excessively weak, the adhered silicon-silicon carbide may not be separated from each other. The ultrasonic treatment of the silicon sludge solution may be performed at a constant intensity of ultrasonic waves, or be performed while changing the intensity of the ultrasonic waves according to the times. When the ultrasonic treatment time is excessively short, the adhered silicon-silicon carbide may not be completely separated from each other, such that separation and recovery efficiency of silicon may be slightly decreased, and when the time is excessively long, the separation efficiency is not further improved and only energy consumption may be increased. Therefore, the ultrasonic treatment may be preferably at an intensity of 200 to 400 W for 20 to 240 minutes.

The present inventors discovered that in separating and recovering silicon from silicon sludge, silicon and silicon carbide may be separated from each other through the ultrasonic treatment, and thus silicon and silicon carbide may be efficiently separated from each other without injecting a separate additive during a separating and recovering process, thereby completing the present invention.

In the colloidal silicon sludge solution in which silicon and silicon carbide are separated from each other by the ultrasonic treatment, the silicon particles may be selectively separated and recovered through centrifugation.

Through the centrifugation, iron and silicon carbide particles that are relatively heavy settle down, and silicon particles that are relatively light are present in an upper layer.

The centrifugation may be performed at 300 to 700 rpm for 5 to 100 minutes. When a rate of the centrifugation is excessively slow or a centrifugation time is excessively short, phase-separation of the silicon sludge solution may not be properly performed, and when a rate of the centrifugation is excessively rapid or a centrifugation time is excessively long, most of silicon is precipitated, such that a recovery rate of silicon may be reduced.

More preferably, the centrifugation may be performed at 450 to 550 rpm for 5 to 75 minutes, and in this case, efficiency of selectively separating and recovering the silicon particles from the silicon sludge solution may be improved.

According to the present invention, the oil component may be removed from the silicon sludge through a distillation process, the adhered silicon-silicon carbide in the silicon sludge may be separated from each other through the ultrasonic treatment, and silicon may be selectively separated and recovered through the centrifugation. In addition, according to the present invention, silicon may be efficiently recovered without injection of an additive for precipitating a specific component or without a separate device such as a magnetic separator, or the like, for removing iron.

Through the method for separating and recovering silicon from silicon sludge according to the present invention, 35 to 95% of silicon may be recovered from the silicon sludge.

DETAILED DESCRIPTION OF EMBODIMENTS

Hereinafter, although the present invention will be described in detail by Examples, they are provided only for understanding of configurations and effects of the present invention and not for limiting the scope of the present invention.

As devices used to ultrasonically treat silicon sludge solution, a digital sonifier (S-450D, Branson Ultrasonic) having a maximum output power of 400 W and an ultrasonic cleaning device (JAC-4020P, Kodo) having a maximum output power of 500 W were used.

As a centrifugal separator, VS-5500N (Vision Science) was used.

In order to analyze crystalline forms, shapes, and sizes of the separated and recovered silicon particles, an X-ray diffractometer (XRD, RTP 300 RC, Rigaku) and a Scanning Electron Microscopy (SEM, JSM-6308LA, Jeol) were used, respectively.

Example 1

Separation and Recovery of Silicon from Silicon Sludge

Figure 1:
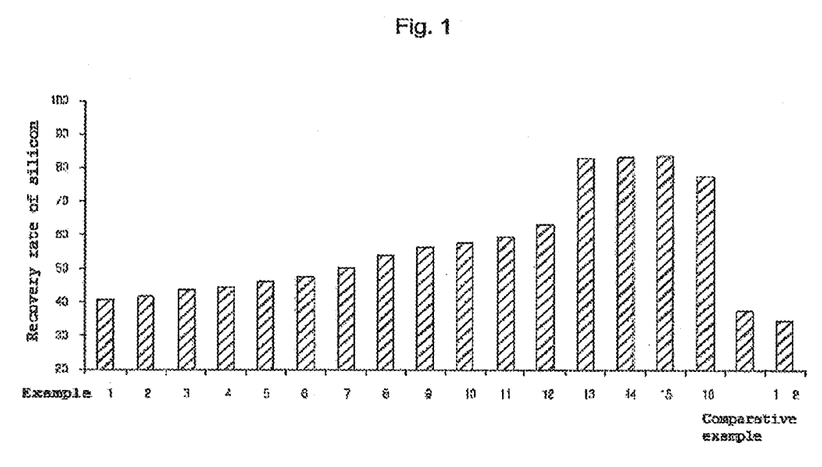
FIG. 1 is a graph showing recovery rates of silicon particles according to Example 1 to 16 and Comparative Examples 1 and 2.

A flask charged with 200 g of waste silicon sludge generated in a semiconductor manufacturing process was heated for 2 hours while maintaining a temperature at 180° C. and distilled to remove oil components. The oil component removed sludge was washed with ethanol to remove the remaining oil component, followed by being dried in a dry oven at 80° C. for 2 hours, such that powder was obtained. After 3 g of the dried powder was dispersed in 200 ml of distilled water to prepare silicon sludge solution, ultrasonic treatment was performed at an ultrasonic intensity of 320 W for 30 minutes by allowing an ultrasonic generator to directly contact the silicon sludge solution using the digital sonifier (S-450D, Branson Ultrasonic), and then phase-separation of silicon sludge solution was performed at 500 rpm for 60 minutes using the centrifugal separator. After centrifugation, a supernatant in silicon sludge solution was recovered and dried in a dry oven at 80° C. for 8 hours, and then properties of particles were analyzed. In addition, a weight of the recovered silicon particle was measured to measure a yield. A recovery rate of the silicon particle was shown in Table 1 and FIG. 1.

Example 2

Separation and Recovery of Silicon from Silicon Sludge

Figure 2:
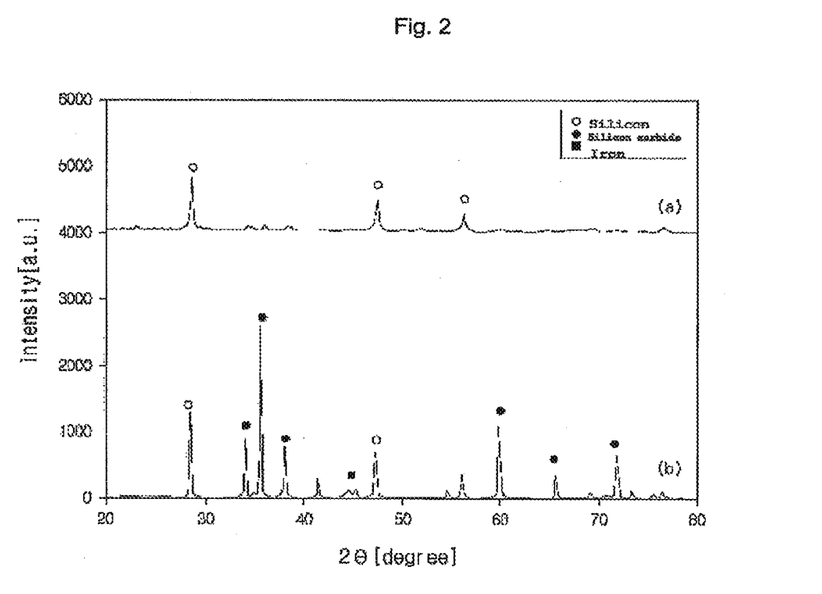
FIG. 2 is a graph showing X-ray diffraction (XRD) analysis results of separated and recovered silicon powders (a) and the remaining residue sludge (b) after silicon separating and recovering processes according to Example 2.

The same processes were performed as those in Example 1 except that ultrasonic treatment of the silicon sludge solution was performed for 60 minutes, and a weight of the recovered silicon particle was measured to measure a yield. A recovery rate of the silicon particle was shown in Table 1 and FIG. 1. After silicon separating and recovering processes, XRD of each of the separated and recovered silicon powders (a) and the remaining residue sludge (b) was analyzed, and the results were shown in FIG. 2.

Example 3

Separation and Recovery of Silicon from Silicon Sludge

The same processes were performed as those in Example 1 except that ultrasonic treatment of the silicon sludge solution was performed for 90 minutes, and a weight of the recovered silicon particle was measured to measure a yield. A recovery rate of the silicon particle was shown in Table 1 and FIG. 1.

Example 4

Separation and Recovery of Silicon from Silicon Sludge

The same processes were performed as those in Example 1 except that ultrasonic treatment of the silicon sludge solution was performed for 120 minutes, and a weight of the recovered silicon particle was measured to measure a yield. A recovery rate of the silicon particle was shown in Table 1 and FIG. 1.

Example 5

Separation and Recovery of Silicon from Silicon Sludge

The same processes were performed as those in Example 1 except that ultrasonic treatment of the silicon sludge solution was performed for 150 minutes, and a weight of the recovered silicon particle was measured to measure a yield. A recovery rate of the silicon particle was shown in Table 1 and FIG. 1.

Example 6

Separation and Recovery of Silicon from Silicon Sludge

The same processes were performed as those in Example 1 except that ultrasonic treatment of the silicon sludge solution was performed at an ultrasonic intensity of 320 W for 60 minutes and centrifugation was performed for 30 minutes, and a weight of the recovered silicon particle was measured to measure a yield. A recovery rate of the silicon particle was shown in Table 1 and FIG. 1.

Example 7

Separation and Recovery of Silicon from Silicon Sludge

The same processes were performed as those in Example 6 except that ultrasonic treatment of the silicon sludge solution was performed for 90 minutes, and a weight of the recovered silicon particle was measured to measure a yield. A recovery rate of the silicon particle was shown in Table 1 and FIG. 1.

Example 8

Separation and Recovery of Silicon from Silicon Sludge

The same processes were performed as those in Example 6 except that ultrasonic treatment of the silicon sludge solution was performed for 120 minutes, and a weight of the recovered silicon particle was measured to measure a yield. A recovery rate of the silicon particle was shown in Table 1 and FIG. 1.

Example 9

Separation and Recovery of Silicon from Silicon Sludge

The same processes were performed as those in Example 6 except that ultrasonic treatment of the silicon sludge solution was performed for 150 minutes, and a weight of the recovered silicon particle was measured to measure a yield. A recovery rate of the silicon particle was shown in Table 1 and FIG. 1.

Example 10

Separation and Recovery of Silicon from Silicon Sludge

The same processes were performed as those in Example 1 except that ultrasonic treatment of the silicon sludge solution was performed at an ultrasonic intensity of 340 W for 150 minutes and centrifugation was performed for 30 minutes, and a weight of the recovered silicon particle was measured to measure a yield. A recovery rate of the silicon particle was shown in Table 1 and FIG. 1.

Example 11

Separation and Recovery of Silicon from Silicon Sludge

The same processes were performed as those in Example 6 except that ultrasonic treatment of the silicon sludge solution was performed for 180 minutes, and a weight of the recovered silicon particle was measured to measure a yield. A recovery rate of the silicon particle was shown in Table 1 and FIG. 1.

Example 12

Separation and Recovery of Silicon from Silicon Sludge

The same processes were performed as those in Example 6 except that ultrasonic treatment of the silicon sludge solution was performed for 210 minutes, and a weight of the recovered silicon particle was measured to measure a yield. A recovery rate of the silicon particle was shown in Table 1 and FIG. 1.

Example 13

Separation and Recovery of Silicon from Silicon Sludge

Figure 3:
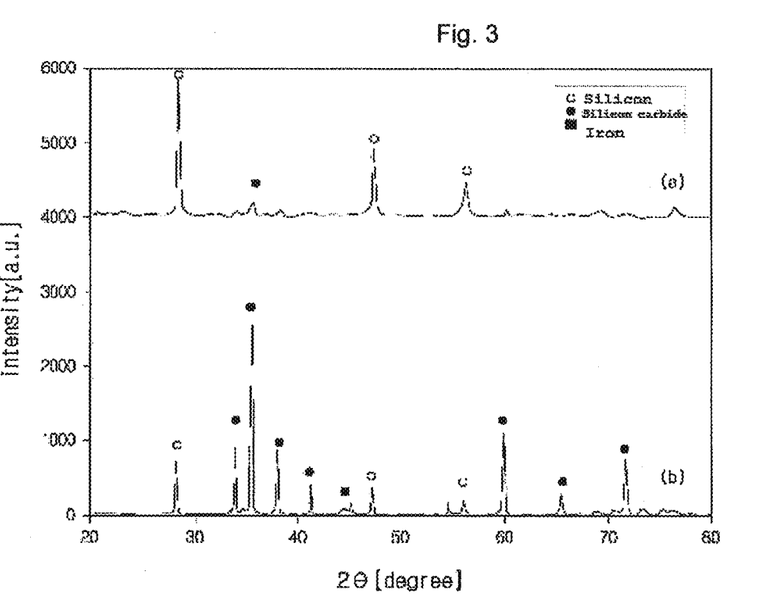
FIG. 3 is a graph showing XRD analysis results of separated and recovered silicon powders (a) and the remaining residue sludge (b) after silicon separating and recovering processes according to Example 13.
Figure 4:
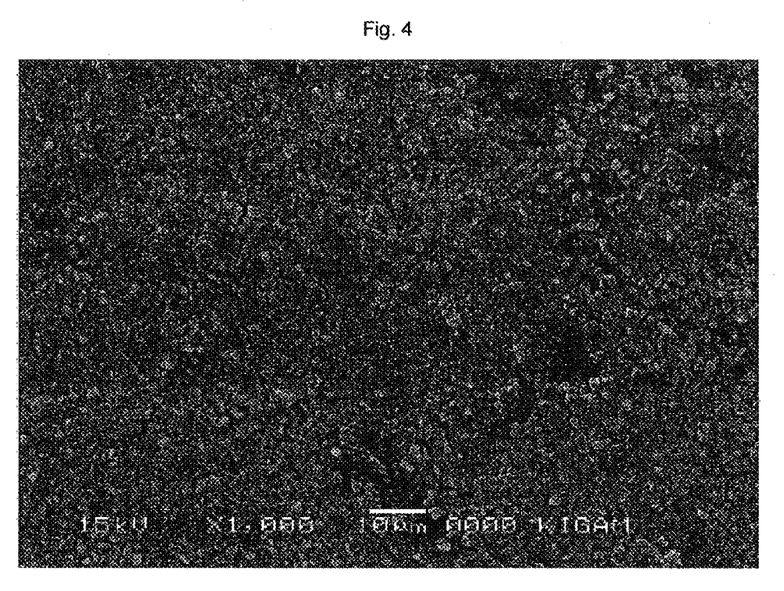
FIG. 4 is a scanning electronic microscope (SEM) photograph of the separated and recovered silicon powders after the silicon separating and recovering processes according to Example 13.
Figure 5:
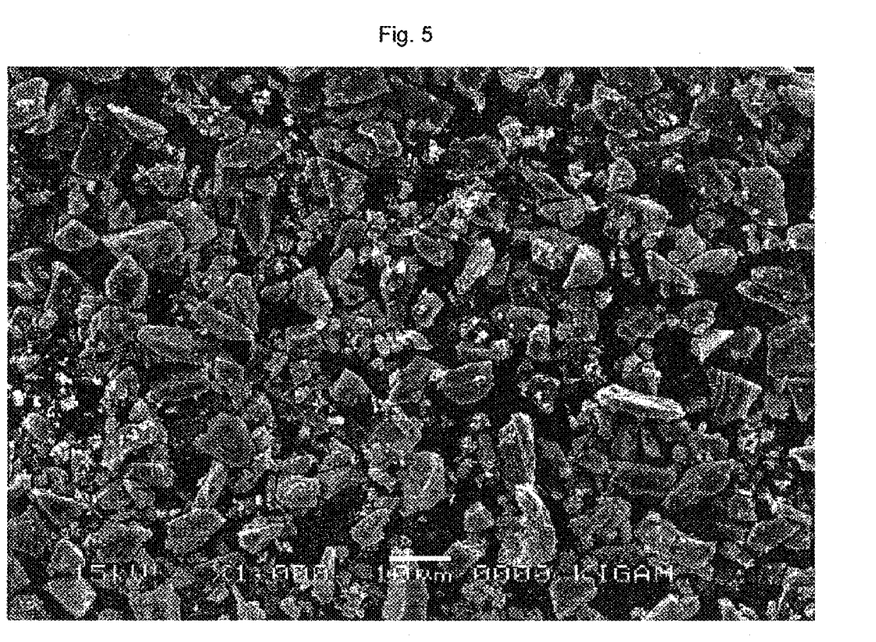
FIG. 5 is a scanning electronic microscope (SEM) photograph of the remaining residue sludge (b) after the silicon separating and recovering processes according to Example 13.

The same processes were performed as those in Example 1 except that ultrasonic treatment of the silicon sludge solution was performed at an ultrasonic intensity of 360 W for 120 minutes and centrifugation was performed for 12 minutes, and a weight of the recovered silicon particle was measured to measure a yield. A recovery rate of the silicon particle was shown in Table 1 and FIG. 1. After silicon separating and recovering processes, XRD of each of the separated and recovered silicon powders (a) and the remaining residue sludge (b) was analyzed, and the results were shown in FIG. 3, and scanning electronic microscope (SEM) photographs thereof were shown in FIGS. 4 and 5, respectively.

Example 14

Separation and Recovery of Silicon from Silicon Sludge

The same processes were performed as those in Example 13 except that ultrasonic treatment of the silicon sludge solution was performed for 150 minutes, and a weight of the recovered silicon particle was measured to measure a yield. A recovery rate of the silicon particle was shown in Table 1 and FIG. 1.

Example 15

Separation and Recovery of Silicon from Silicon Sludge

The same processes were performed as those in Example 13 except that ultrasonic treatment of the silicon sludge solution was performed for 180 minutes, and a weight of the recovered silicon particle was measured to measure a yield. A recovery rate of the silicon particle was shown in Table 1 and FIG. 1.

Example 16

Separation and Recovery of Silicon from Silicon Sludge

The same processes were performed as those in Example 13 except that in the ultrasonic treatment of the silicon sludge solution, the ultrasonic treatment was indirectly performed through water from the ultrasonic generator using the ultrasonic cleaning device (JAC-4020P, Kodo) having the maximum output power of 500 W, and a weight of the recovered silicon particle was measured to measure a yield. A recovery rate of the silicon particle was shown in Table 1 and FIG. 1.

Comparative Example 1

Separation and Recovery of Silicon from Silicon Sludge

The same processes were performed as those in Example 13 except that ultrasonic treatment was not performed at all, and only distillation and centrifugation were performed, and a weight of the recovered silicon particle was measured to measure a yield. A recovery rate of the silicon particle was shown in Table 1 and FIG. 1.

Comparative Example 2

Separation and Recovery of Silicon from Silicon Sludge

The same processes were performed as those in Example 13 except that the silicon sludge solution was precipitated at room temperature for 48 hours to recover a supernatant, instead of phase-separation of the silicon sludge solution using a centrifugal separator and a weight of the recovered silicon particle was measured to measure a yield. A recovery rate of the silicon particle is shown in Table 1 and FIG. 1.

TABLE 1

| Classification | Ultrasonic intensity (W) | Ultrasonic treatment time (min) | Centrifugation time (min) | Recovery rate of silicon (%) |
|---|---|---|---|---|
| Example 1 | 320 | 30 | 60 | 40.8 |
| Example 2 | 320 | 60 | 60 | 41.5 |
| Example 3 | 320 | 90 | 60 | 44.2 |
| Example 4 | 320 | 120 | 60 | 44.8 |
| Example 5 | 320 | 150 | 60 | 46.2 |
| Example 6 | 320 | 60 | 30 | 47.8 |
| Example 7 | 320 | 90 | 30 | 50.5 |
| Example 8 | 320 | 120 | 30 | 54.0 |
| Example 9 | 320 | 150 | 30 | 56.5 |
| Example 10 | 340 | 150 | 30 | 57.8 |
| Example 11 | 340 | 180 | 30 | 59.3 |
| Example 12 | 340 | 210 | 30 | 63.2 |
| Example 13 | 360 | 120 | 12 | 83.0 |
| Example 14 | 360 | 150 | 12 | 83.2 |
| Example 15 | 360 | 180 | 12 | 83.4 |
| Example 16 | 360 | 120 | 12 | 78.0 |
| Comparative Example 1 | — | — | 12 | 37.8 |
| Comparative Example 2 | 360 | 120 | — | 34.9 |

As seen from the results in Table 1, a method for separating and recovering silicon from silicon sludge according to the present invention had a high recovery rate in selectively separating silicon from the silicon sludge through the ultrasonic treatment and centrifugation.

With the method for separating and recovering silicon from silicon sludge according to the present invention, oil components, iron, silicon carbide that are included in the silicon sludge may be removed and silicon may be selectively separated and recovered. In addition, according to the present invention, silicon may be efficiently recovered without injection of an additive for precipitating a specific component or without a separate device such as a magnetic separator, or the like, for removing iron.

What is claimed is:
1. A method for separating and recovering silicon from silicon sludge, comprising:
   (a) distilling silicon sludge generated in a semiconductor manufacturing process to remove oil components;
   (b) dispersing the distilled silicon sludge in distilled water to prepare a silicon sludge solution in which a concentration of silicon sludge is from 2 to 4 weight %;
   (c) performing ultrasonic treatment by applying ultrasonic waves to the silicon sludge solution at an intensity of 200 W to 400 W for 20 to 240 minutes;

(d) performing centrifugation on the ultrasonic treated silicon sludge solution at 300 to 700 rpm for 5 to 100 minutes to perform phase-separation; and (e) recovering silicon particles from the phase-separated silicon sludge solution by single centrifugation.

2. The method for separating and recovering silicon from silicon sludge of claim 1, wherein in step (a), the distillation of the silicon sludge is performed at 100 to 300° C.

3. The method for separating and recovering silicon from silicon sludge of claim 2, wherein the distillation of the silicon sludge is performed at 150 to 200° C.

4. The method for separating and recovering silicon from silicon sludge of claim 1, wherein a recovery rate of silicon recovered from the silicon sludge is 35 to 90%.

* * * * *